No. 656,217. Patented Aug. 21, 1900.
W. ROETTINGER & J. CONN.
APPARATUS FOR MANUFACTURING CORELESS CAN ICE.
(Application filed July 6, 1897.)
(No Model.)
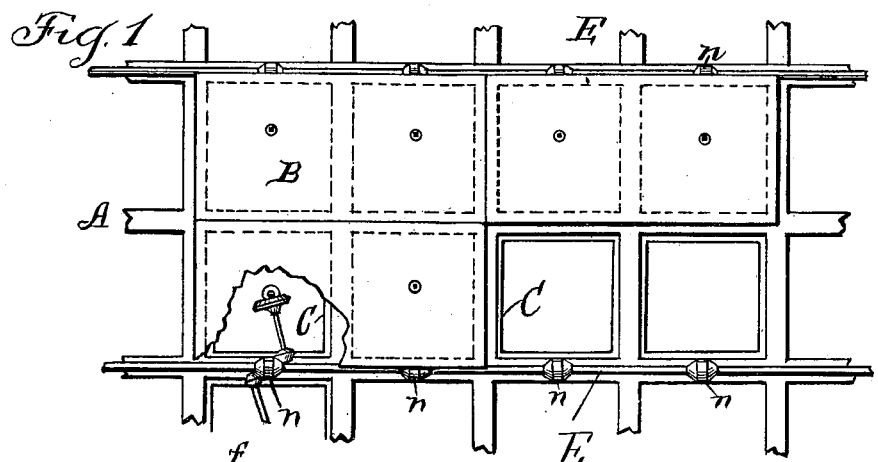
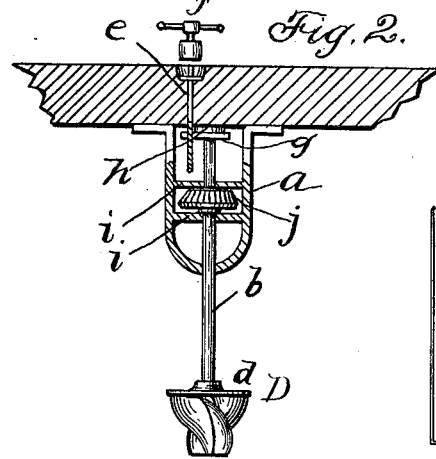
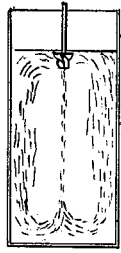
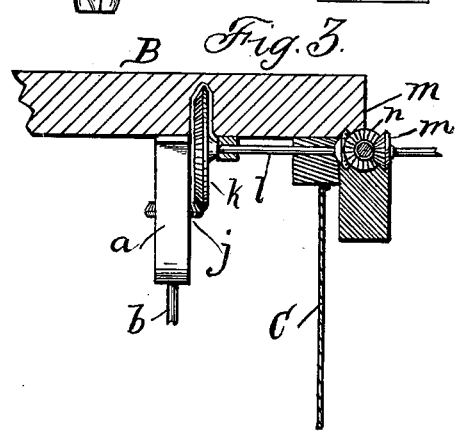
WITNESSES:
William J. Peek
J. C. Lemon
INVENTORS
Wm Roettinger and
John Conn
BY Chas Imbeck
their ATTORNEY.
THE NORRIS PETERS CO., PHOTO-LITHO., WASHINGTON, D. C.

UNITED STATES PATENT OFFICE.

WILLIAM ROETTINGER, OF NEWPORT, AND JOHN CONN, OF BELLEVUE, KENTUCKY; SAID WILLIAM ROETTINGER ASSIGNOR OF ONE-FOURTH TO WILLIAM D. ROETTINGER, OF NEWPORT, KENTUCKY.

APPARATUS FOR MANUFACTURING CORELESS CAN-ICE.

SPECIFICATION forming part of Letters Patent No. 656,217, dated August 21, 1900.

Application filed July 6, 1897. Serial No. 643,659. (No model.)

*To all whom it may concern:*

Be it known that we, WILLIAM ROETTINGER, residing at Newport, and JOHN CONN, residing at Bellevue, in the county of Campbell and State of Kentucky, citizens of the United States, have invented certain new and useful Improvements in Apparatus for Manufacturing Coreless Can-Ice, of which the following is a full, clear, and exact description, reference being had to the accompanying drawings, forming part of this specification.

Our invention relates to the manufacture of coreless can-ice, which for the convenience of commercial purposes is frozen in cans, which may be of the customary or any suitable size and which are partially submerged side by side in rows in the tank or vat of freezing brine; and it has for its object the provision of means whereby the water within the can during the time of freezing shall be so agitated that the ice when ready to be harvested from the cans shall not only be free from the usual central core, but also that all of the impurities in the water shall be collected and contained in a cavity in the top of the cakes, from which when harvested in the usual manner it is removed, leaving as the result beautiful clear cakes of ice without any central core and as free as possible from all impurities.

Our invention primarily consists in placing in each can at its middle and just below the surface of the water within the can a revolving agitator of such shape that when revolved the water is drawn into it and is forced down in a compact small stream to the bottom of the can, where it diverges and passes up to the surface of the water and is then again drawn in and then forced down, this operation being continued until the water within the can is entirely frozen, except that portion in the cavity immediately around the agitator, which will be found to contain all of the impurities which were in the water.

It also relates to novel and simple means whereby the above results are accomplished and whereby the apparatus is adapted to the present arrangement of freezing-tanks with their removable covers.

The novelty of our invention will be hereinafter more fully set forth, and specifically pointed out in the claims.

In the accompanying drawings, Figure 1 is a broken plan view of a portion of the top of a freezing-tank and its covers, showing the application of our invention thereto. Fig. 2 is an enlarged sectional elevation of a part of one of the covers, showing the application thereto of one of the agitators. Fig. 3 is a corresponding view, on a vertical section, at right angles to Fig. 2, showing the driving mechanism for the agitator-shaft. Fig. 4 is a sectional elevation of one of the cans indicating the course of circulation of the water under the action of the agitator. Fig. 5 is a side elevation of one form of agitator. Fig. 6 is an enlarged top plan view of the same with the top plate removed.

The same letters of reference are used to indicate identical parts in all the figures.

Referring to Fig. 1, A are the top sills of the freezing-tank of the usual or any suitable construction for supporting the lids or covers B, which in this instance we have shown of a size to cover two cans C, though, if preferred, there might be a lid for each can. Secured to the under side of the covers B, just over the middle of each can, is a bracket or stirrup $a$, in which is vertically journaled a shaft $b$, having secured upon its lower end an agitator D, preferably frusto-conoidal in outline with its small end downward and composed of curved blades $c$, which, as shown in Figs. 5 and 6, may have vertical inner and outer walls, or, as shown in Fig. 2, may be set spirally. These agitators are preferably covered by a top plate $d$, to which the shafts $b$ are secured. Passing down through the covers adjacent to the shafts $b$ are stems $e$, Fig. 2, whose upper squared ends are in recesses in the floor and are adapted to be engaged by turning keys $f$. The lower ends of the stem $e$ beneath the covers are threaded and engage plates $g$, having perforations for the free passage of the shafts $b$, which are supported thereby by means of bosses or collars $h$, fast on the upper end of the shafts $b$ and resting on the tops of the plates $g$ in such manner that by turning the stems $e$ the shafts $b$ are raised or lowered to correspondingly raise or lower the agitators D. Feathered on the shafts $b$, between crosspieces $i$ of the stirrup $a$, are beveled gears $j$, Figs. 2 and 3, with which mesh larger gears $k$ on the inner ends of shafts $l$, suitably journaled on the under side of the covers and carried thereby, and whose outer ends have upon them small beveled pinions $m$, meshing with double-beveled pinions $n$ on longitudinal shafts E, of which there are a series, as seen in Fig. 1, parallel to each other, journaled upon every alternate sill A and extending entirely across the freezing-tank, with their projecting ends at one end of the tank, provided with pulleys or gearing in such manner that all may be simultaneously and uniformly rotated to give simultaneous and uniform rotation to all the agitators, as will be readily understood.

When the cans are filled with water to be frozen and are in position in the tank, the covers are placed thereon, thereby bringing the gears $m$ $n$ and $k$ $j$ into mesh. The shafts $b$ are lowered so as to just submerge the agitators D beneath the surface of the water in the cans and the shafts E are set in motion. With agitators having a diameter of from four to five inches at their lower ends and a depth of about three inches we have found from practical tests that with an initial speed of about one hundred and eighty (180) revolutions of the agitators to the minute excellent results were obtained and the ice taken from the cans was solid, clear, and without a core. Shortly before harvesting the ice and before the freezing of the water is entirely completed the shafts $b$ are raised to partially raise the agitators and bring their tops above the surface of the water, and the speed of revolution is decreased. This leaves a conical cavity in the top of the ice, in which is found to be collected all the impurities contained in the water, and this when the cans are lifted out and submerged in warm water, as is customary, is washed away.

By the above-described arrangement all of the machinery excepting the projecting ends of the shafts E is under the floors B and out of the way, and at the same time the floors may be independently lifted to give access to the cans without disarranging any of the parts and may be instantly replaced to bring the parts into working relation, as will be readily understood.

Having thus fully described our invention, we claim—

1. The combination of an ice-forming can containing water to be frozen, a freezing-tank therefor containing a liquid-freezing mixture, a vertically-set revoluble agitator submerged just below the surface of the water in the ice-forming can at its center and terminating a short distance below the surface of the water in said can, said agitator being constructed to draw the water at the top of the can toward itself and force the same downward whence it spreads and arises at the sides of the can, and means for revolving said agitator, substantially as described.

2. The combination of an ice-forming can, a freezing-tank therefor, a vertically-set frusto-conoidal agitator with curved blades arranged at the center of the can and adapted to draw the water toward itself and force it downward, and means for revolving said agitator, substantially as described.

3. In a can-freezing system, the combination of the freezing-tank, its independently-removable covers, agitators suspended and carried therefrom, driving-shafts journaled below the covers, and intermeshing gearing between said shafts and agitators, substantially as described.

4. In apparatus of the character described, the combination and arrangement of the shafts, E, provided with gears, $n$, covers, B, having journaled thereunder, shafts, L, provided with gears, $m$, $k$, stirrups, $a$, on the under side of the covers, shafts, $b$, journaled therein, and carrying agitators, gears, $j$, feathered on shafts, $b$, and means for raising and lowering the agitators, substantially as described.

WILLIAM ROETTINGER.
JOHN CONN.

Witnesses:
H. K. ROGERS,
BERNARD J. HAUSFELD.